United States Patent [19]

McNeely

[11] Patent Number: 5,307,831
[45] Date of Patent: May 3, 1994

[54] SAFETY RELIEF VALVE FOR PRESSURE VESSELS

[75] Inventor: Michael D. McNeely, Katy, Tex.

[73] Assignee: Keystone International Holdings Corp., Houston, Tex.

[21] Appl. No.: 23,554

[22] Filed: Feb. 26, 1993

Related U.S. Application Data

[63] Continuation-in-part of Ser. No. 906,559, Jun. 29, 1992, abandoned.

[51] Int. Cl.$^5$ ............................................. F16K 17/196
[52] U.S. Cl. ...................................... 137/14; 137/471; 137/493.4; 137/494
[58] Field of Search ............ 137/471, 473, 469, 493.4, 137/494, 14

[56] References Cited

U.S. PATENT DOCUMENTS

| | | | |
|---|---|---|---|
| 1,620,719 | 3/1927 | Buck | 137/469 |
| 1,916,767 | 7/1933 | Mason | 137/471 |
| 2,214,963 | 9/1940 | Jurs . | |
| 2,969,084 | 1/1961 | Raymond | 137/471 |
| 3,126,909 | 3/1964 | Sweatt | 137/471 |
| 3,477,456 | 11/1969 | Powell . | |
| 3,881,505 | 6/1975 | Dunkelis . | |
| 3,918,418 | 11/1975 | Horn | 137/469 X |
| 4,410,005 | 10/1983 | Reip . | |
| 4,705,065 | 11/1987 | McNeely et al. . | |
| 4,881,572 | 11/1989 | Bengtsson . | |
| 5,064,169 | 11/1991 | Alberts | 137/469 X |

Primary Examiner—Robert G. Nilson
Attorney, Agent, or Firm—Bush, Moseley & Riddle

[57] ABSTRACT

A fluid pressure safety relief system for a pressure vessel (10) having a main valve member (46) seating on a nozzle ring (38) under a mechanical force of a predetermined amount resulting from a calibrated counterweight (54). An operating rod (55) is connected between the main valve member (46) and a piston (74) having one side in fluid communication with fluid pressure in the pressure vessel (10). A fluid chamber (78) is provided on the other side of piston (74) and a fluid passage (84) from fluid chamber (78) has an outlet at its upper end (86) closely adjacent the nozzle ring (38). Upon unseating of the valve member (46) from the nozzle (38), fluid flows from the fluid chamber (78) to increase the fluid pressure differential across the piston (74) to assist in the movement of the main valve member (46) to an open position.

15 Claims, 2 Drawing Sheets

SAFETY RELIEF VALVE FOR PRESSURE VESSELS

CROSS REFERENCE TO RELATED APPLICATION

This application is a continuation-in-part of application Ser. No. 906,559 filed Jun. 29, 1992 and entitled "Fluid Pressure Relief System For Pressure Vessels", now abandoned.

FIELD OF THE INVENTION

This invention relates to a safety relief valve for pressure vessels, and more particularly to a safety relief valve for the vent of a pressure vessel operable under a positive pressure.

BACKGROUND OF THE INVENTION

In the field of relief valve design for tanks under positive or negative pressure relative to the atmosphere, it has always been necessary to have devices to relieve excess pressure or eliminate a vacuum or negative pressure condition. In this field devices of all types have been employed. Simple weight-loaded disc valves have been used for many years but have the disadvantage of leakage occurring at pressures significantly below the relieving pressure. For example, a weight loaded disc valve over a vent has been provided which initially opens at a predetermined pressure. However, these devices normally require a 50 to 100 percent overpressure above the set pressure to fully lift the valve member and reach a full open position at the full rated capacity. As a result such valves heretofore have required a low set pressure relative to the maximum allowable working pressure (MAWP) of the pressure vessel which requires that normal operating pressure be kept at low inefficient levels, or else the valves have a set pressure closer to MAWP but will not obtain full rated capacity at 20 percent overpressure. In order to avoid the above undesirable conditions, a larger size vent than normally required is sometimes utilized. The required capacity at a 20 percent overpressure above MAWP as required by certain regulations is obtained at a partial lift. However, utilizing a larger valve than needed is uneconomical. More complex pressure relieving devices have also been employed such as pilot operated relief valves. Pilot operated relief valves are used when very tight seating and low overpressure requirements to full capacity are desirable.

As shown in pending application Ser No. 906,559, a safety relief valve is provided for an emergency vent in a pressure vessel particularly adapted for use with low pressure vessels designed for a pressure under 15 psi. A weighted valve member is seated on a seat ring under a predetermined constant loading and is moved upwardly to an unseated open position at a predetermined fluid pressure within the pressure vessel above the maximum allowable working pressure (MAWP). An operating rod is secured adjacent its upper end to the weighted valve member and secured adjacent its lower end to a diaphragm. A separate pilot valve is in fluid communication with a diaphragm fluid chamber formed by the operating rod diaphragm thereby to control the operation of the main valve member. Thus, a pilot valve separate from the pressure relief valve is provided for control of the main valve member.

SUMMARY OF THE INVENTION

The present invention is directed to a safety relief valve for a vent in a pressure vessel utilizing a mechanically loaded valve member seated on a seat member about the vent under a predetermined loading and moved upwardly to an unseated open position at a predetermined fluid pressure within the pressure vessel above the maximum allowable working pressure (MAWP). However, a separate pilot valve is not normally used in combination with the safety relief valve to control the opening and closing of the main valve member loaded under a weight or spring, for example.

The safety relief valve of the present invention incorporates an integral auxiliary control system for the loaded relief valve member for a pressure vessel without the use of a separate external pilot valve in fluid communication with the pressure vessel. Thus, by integrating such an auxiliary control system within the safety valve, a control system is provided which performs the function of an external pilot system. Such an integral auxiliary control system incorporated with the relief valve provides a simplified control system and eliminates a separate external pilot valve with associated moving pilot parts.

The auxiliary control system allows the vent valve member which comprises a disc to be set at the MAWP and to move to full open position at full rated capacity at an overpressure less than 20 percent above the MAWP. The nozzle on which the vent valve member is seated is upstream of the valve member and in continuous fluid communication with the pressure vessel or tank. The control elements for controlling the opening and closing of the vent valve are positioned generally within the pressure vessel upstream of the valve member thereby to provide a compact structure with minimal external parts or elements.

The fluid pressure safety relief system for a pressure vessel or tank of this invention comprises a main valve member urged downwardly on a nozzle under a predetermined load and having a downwardly extending operating rod connected thereto. The nozzle is upstream of the main valve member and is in continuous fluid communication with the interior fluid pressure of the pressure vessel. A fluid pressure responsive member comprising a piston is connected to the lower end of the operating rod and has an enclosed fluid chamber on one side thereof. The other side of the piston is in fluid communication with the interior of the pressure vessel. A fluid passage from the enclosed fluid chamber has an outlet positioned adjacent the nozzle on the upstream side of the main valve member and is in continuous fluid communication with the interior fluid pressure of the pressure vessel. Upon an increase in pressure within the pressure vessel, the main valve member is opened and fluid from the enclosed fluid chamber flows to atmosphere through the outlet of the fluid passage at the nozzle thereby to reduce the pressure on one side of the piston. This results in a fluid pressure differential on opposite sides of the piston for movement of the piston thereby to assist in movement of the main valve member to a full open position.

An orifice of a predetermined size is provided in the fluid pressure responsive member or piston to provide a controlled fluid flow passage between the interior of the pressure vessel and the enclosed fluid chamber and thereby provide a differential pressure between the pressure vessel and the enclosed fluid chamber proportional to increases and decreases in the internal fluid pressure of the pressure vessel. Upon an initial cracking of the main valve member at a very low fluid pressure differential, the fluid pressure in the enclosed fluid chamber and fluid passage remain substantially equal to the pressure in the pressure vessel or tank as a result of fluid communication through the orifice. Upon an increase in fluid pressure within the tank, the main valve member opens initiating a fluid flow through the control orifice into the enclosed fluid chamber and out through the fluid passage at the nozzle causing a pressure differential across the pressure responsive member. As a result of the pressure differential across the pressure responsive member, a maximum lifting force for the main valve member is provided with a minimum overpressure within the tank or pressure vessel. Since the outlet for the flow passage is located adjacent the nozzle, the fluid pressure at the outlet at the full open position of the main valve member approaches atmospheric pressure.

This invention provides a safety relief system in which a pressure responsive member connected to the main valve member has an enclosed fluid chamber on one side thereof in fluid communication with a fluid outlet closely adjacent the nozzle for the flow of fluid from the chamber upon opening of the main valve member thereby to provide a pressure differential across the pressure responsive member to assist in movement of the main valve member to a full open position at a minimal overpressure relation within the tank or pressure vessel.

The present invention thus provides a safety relief valve which relieves at a predetermined set overpressure and permits the main valve member to move to a full open position with a minimal overpressure condition such as under an emergency situation. The results achieved by the present invention are generally similar to those obtained by a separate pilot valve.

It is an object of this invention to provide a safety relief valve which may be set at the maximum allowable working pressure (MAWP) of a pressure vessel to eliminate fluid leakage at pressures below set pressure and to move to a full open position at an overpressure less than 20 percent over MAWP.

Other objects, features, and advantages of this invention will become more apparent after referring to the following specification and drawings.

DESCRIPTION OF THE INVENTION

Figure 1:
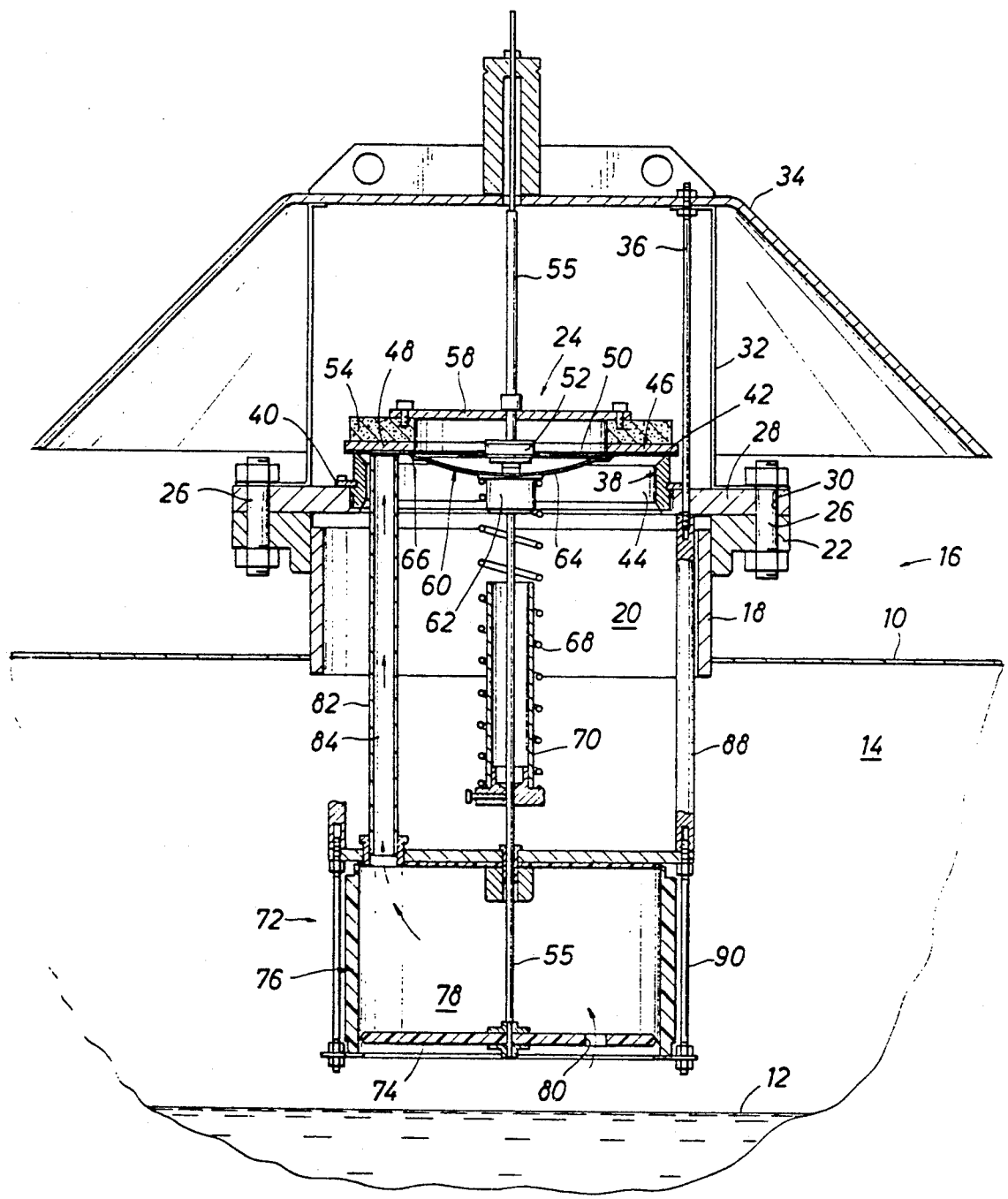
FIG. 1 is an enlarged sectional view of the safety relief valve of the present invention mounted on a pressure vessel having a vent with the main valve member shown in closed seated position over the vent under a predetermined loading resulting from a weight.

Referring to FIG. 1, a fluid pressure relief system in accordance with the present invention is illustrated in which a pressure vessel is shown generally at 10 and comprises a tank preferably having a liquid fluid stored therein with the liquid level shown at 12 and the vapor space 14 in the tank above the liquid. Pressure vessel 10 has an outlet generally indicated at 16 including a tubular housing 18 projecting upwardly from pressure vessel 10 and defining an opening illustrated at 20. Housing 18 includes an outwardly extending upper horizontal flange 22.

A safety relief valve is shown generally at 24 supported on flange 22 by suitable nut and bolt combinations 26. Safety relief valve 24 may be installed as a retrofit unit on a flange of an existing tank, if desired. Relief valve 24 comprises an annular mounting plate or ring 28 having a plurality of spaced openings 30 for receiving nut and bolt combinations 26. A plurality of upwardly extending circumferentially spaced supports or brackets 32 have lower flanges supported on mounting plate 28 and secured by nut and bolt combinations 26. An upper cover 34 is supported on brackets 32 and support rods or struts 36 extending from plate 28.

Mounting ring 28 is notched along its inner circumference to form a lower abutment or seat 37 on which a separate inner concentric nozzle or nozzle ring 38 is supported. An outer annular groove or slot 39 in nozzle ring 38 receives a pair of semicircular strips 40 and strips 40 are bolted at 41 to mounting ring 28. Nozzle ring 38 seats loosely on abutment 37 prior to securement of strips 40 and an O-ring seal 43 seals between nozzle ring 38 and mounting ring 28. Nozzle ring 38 forms an upper annular seat 42 and a vent 44. Since nozzle ring 38 is a separate member from mounting ring 28, the transfer of stresses between rings 28, 38 is prevented or minimized thereby minimizing any distortions transferred between the two rings. A main pressure relief valve member generally indicated at 46 includes an outer seat ring 48 connected by ribs or spokes 50 to an inner hub 52 and having an inner liner 51. Seat ring 48 comprises an annular plate which extends radially outwardly of nozzle ring 38 to provide an increased area exposed to fluid pressure upon opening of relief valve 46. An annular counterweight 54 is mounted on seat ring 48 to maintain seat ring 48 in seated closed position on annular seat 42 over vent 44 under a predetermined constant loading with seat ring 48 moved upwardly to an unseated open position at a predetermined fluid pressure within tank 10 for fluid flow through vent 44. A limited flexure of nozzle ring 38 relative to mounting plate 28 may occur from seating of valve member 46 on upper seat 42. While a counterweight has been shown in the drawings as providing a gravity loading against seat ring 48 to hold seat ring 48 in a normal seated position on nozzle seat 42, it is to be understood that other types of mechanical loadings could be applied against seat ring 48 such as a variable spring load on the weight of the valve member itself, for example.

An operating shaft or rod 55 is secured to hub 52 of valve member 46. Cross members 58 are secured between rod 55 and counterweight 54 to maintain counterweight 54 in position. Mounted beneath main valve member 48 for sliding movement on operating rod 55 is a vacuum valve member generally indicated at 60 having a hub 62 receiving rod 55 and a generally concave vacuum plate member 64 secured to hub 62. Plate member 64 has an annular seat 66 adapted to seat against the lower surface of main valve member 48. A vacuum spring 68 extends about a support tube 70 secured to rod 55 to continuously urge vacuum valve member 60 into seating contact against main valve member 46. Support tube 70 may be adjusted along rod 55. Upon the reaching of a predetermined low or negative pressure in tank 10, vacuum valve 64 moves downwardly along rod 55 to an open position relative to main valve member 46 to permit fluid flow from atmosphere through ribs 50 of seat ring 48 and an increase in fluid pressure in tank 10.

A control means for relief valve member 46 is provided to permit main valve member 46 to remain seated on nozzle ring 38 to minimize leakage of fluid from vent 44 at pressures below MAWP and to permit main valve member 46 to move to full open position at an overpressure less than 20 percent over MAWP. The control means is mounted upstream of main valve member 46 generally within the pressure vessel or tank 10. The control means comprises fluid pressure responsive means generally indicated at 72 connected to operating rod 55 for controlling the opening and closing of main valve member 46. Fluid pressure responsive means 72 includes a piston 74 secured to the lower end of operating rod 55 and mounted for reciprocable movement within a cylinder 76 forming a fluid chamber 78 on one side of piston 74. An orifice 80 of a predetermined size is provided in piston 80 to permit fluid communication of fluid chamber 78 with the internal fluid pressure in tank 10. Orifice 80 may, for example, be between 0.387 inch and 1.00 inch for a piston having a diameter of around fifteen (15) inches. An outlet tube 82 has a lower end connected to cylinder 76 and forms a fluid passage 84 from fluid chamber 78 leading to nozzle ring 38. The upper end 86 of outlet tube 82 is positioned adjacent nozzle ring 38 and is spaced slightly from the lower surface of liner 51 on valve member 48 as will be explained further.

Figure 2:
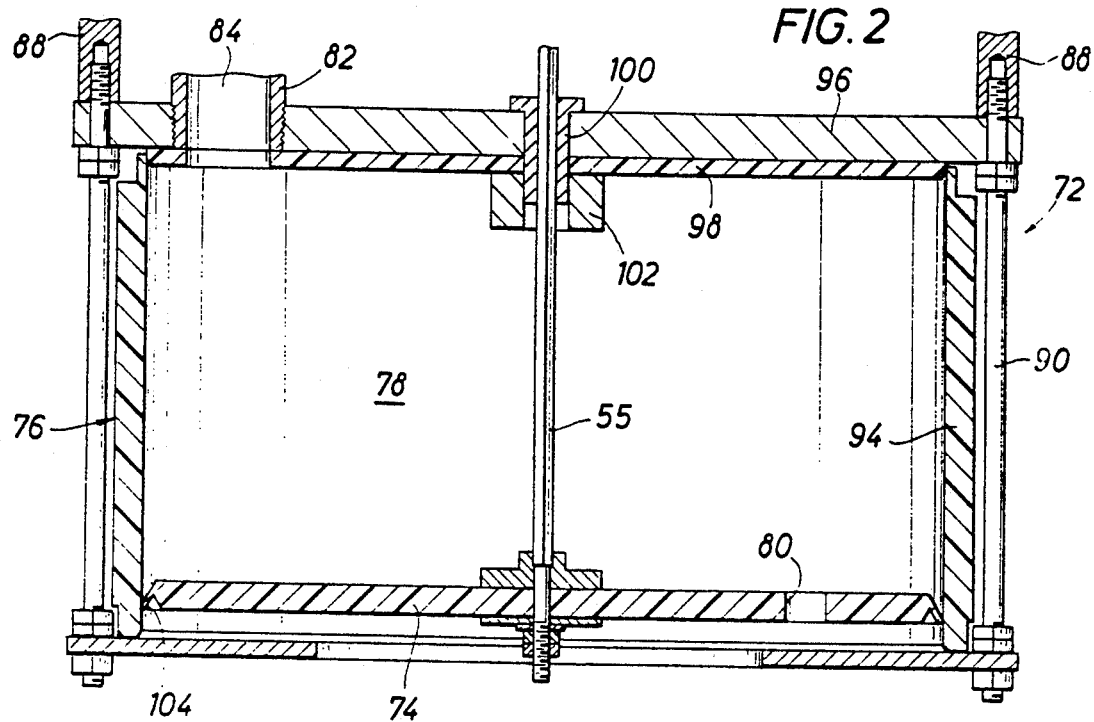
FIG. 2 is an enlarged sectional view of the fluid control means for the main valve member showing a pressure responsive member connected to an operating rod for the main valve member and responsive to a fluid pressure differential between the interior of the pressure vessel and the adjacent fluid chamber.
Figure 3:
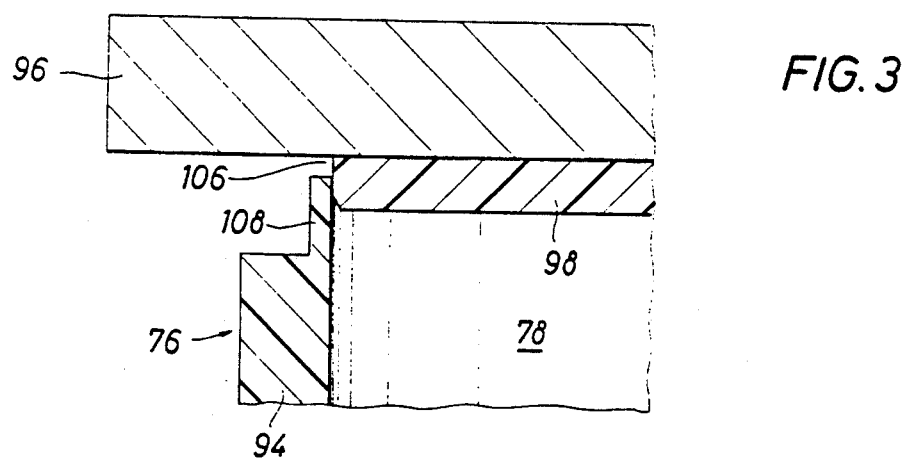
FIG. 3 is an enlarged sectional view of a corner of the fluid pressure responsive means shown in FIG. 2 illustrating the thermal expansion of the separate elements of the pressure responsive means.
Figure 4:
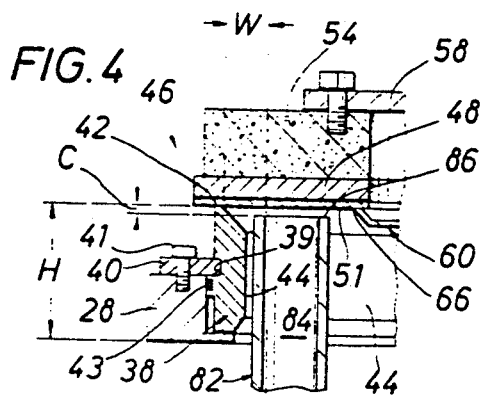
FIG. 4 is an enlarged sectional view of a fragment of FIG. 1 showing the outlet for the flow passage from the fluid chamber positioned closely adjacent the nozzle on which the main valve member is shown in closed position.

As shown also in FIG. 2, intermediate and lower support rods 88 and 90 support cylinder 76. Intermediate rods 88 are connected to upper rods 36 beneath mounting plate 28. Lower rods 90 are connected to a lower support plate 92. Cylinder 76 includes a cylindrical body 94 resting on plate 92 and an upper end 96 secured to rods 88. Upper end 96 has an inner liner 98 secured thereto. A suitable guide 100 and securing nut 102 on end 96 receive operating rod 55 for sliding movement. Piston 74 has an outer peripheral lip 104 contacting cylindrical body 94 with a minimal frictional contact. Sealing contact with body 94 is not required for adequate functioning of piston 74 especially in view of orifice 80. To provide maximum sensitivity to the movement of piston 74 upon a fluid pressure differential on opposite side of piston 74, piston 74, cylindrical body 94 and liner 98 are independently mounted and formed of a similar material having the same rate of thermal expansion such as, for example, Teflon, nylon, or polyvinylchloride. As shown in FIG. 3, an expansion gap 106 is provided between upper cylinder end 96 and an upper reduced diameter end 108 of cylindrical body 94. Cylindrical body 94, piston 74 and guide 98 expand and contract together as formed of the same material and gap 106 permits expansion of body 94 relative to upper end 96. Thus, the tolerances between piston 74 and cylindrical body 94 remain constant thereby to maintain the sensitivity of piston 74 at temperature ranges from $-20F.$ to $+140F.$ Referring particularly to FIGS. 4 and 5, the upper end 86 of outlet tube or pipe 82 is shown as projecting within the area defined by nozzle ring 38 and spaced a distance C from the inner surface of main valve member 46 in the closed position thereof. End 86 is spaced a horizontal distance W from nozzle seat 42 and the nozzle has a height H. As a non-limiting example, W is around two (2) inches, C is around one-eighth ($\frac{1}{8}$) inch, and H is around four (4) inches for a nozzle ring around twenty-four (24) inches in diameter. The greater the distance W from the nozzle, the less effective the fluid pressure differential acting on piston 74. The distance W should not exceed a maximum of around four (4) inches. Likewise, the greater the distance C, the less effective the fluid pressure differential acting on piston 74. Distance C could be as great as distance H but would not be very effective if positioned at the lower end of the nozzle. For best results, distance C should be less than around one-half ($\frac{1}{2}$) inch. Satisfactory results under certain conditions such as the diameter of nozzle ring 38 and the size of outlet tube 82 may be obtained with distance C as great as around two (2) inches.

Figure 5:
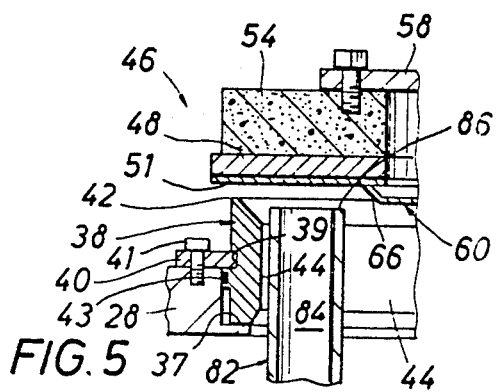
FIG. 5 is a sectional view similar to FIG. 4 but showing the main valve member in a partially open position with a flow of fluid from the outlet to atmosphere between the nozzle and main valve member.

Upon an increase in pressure within tank 10 above MAWP, valve member 46 opens to permit flow through vent 44 as shown in FIG. 5 which provides a low pressure zone adjacent nozzle ring 38 resulting from dynamic fluid pressure losses. The low fluid pressure is sensed at the upper end 86 of outlet tube 82 and fluid flow then is established through orifice 80, fluid chamber 78, and outlet tube 84. The differential pressure resulting from this fluid flow acts against piston 74 to assist in movement of valve member 46 to full open position. The size of orifice 80 is utilized to control the sensitivity of main valve member 46 after opening. For example, a smaller orifice size for orifice 80 would provide a larger fluid differential and increase the speed of movement of valve member 46 toward full open position upon an increasing fluid pressure within tank 12. Thus, a precise and exact full lift overpressure for full opening of main valve member 46 such as 15 percent over the MAWP could be achieved by sizing of orifice 80.

In operation, upon the fluid pressure in tank 10 increasing to a predetermined value as established by the calibration of counterweight 54, the seating force of the main valve member 48 on nozzle seat 42 is reduced to allow unseating of valve member 46 and fluid leakage at nozzle seat 42 at the "crack pressure". Upon a further increase in fluid pressure within tank 10, main valve member 46 moves further in an upward direction with the amount of movement proportional to the increase in tank pressure. At the initial crack pressure, the fluid pressure in piston chamber 78 and outlet tube 82 are the same as the internal pressure in tank 10 since chamber 78 is in fluid communication with the interior of tank 10 through orifice 80 and the upper end 86 of tube 82. As the fluid pressure within tank 10 increases, fluid flow from outlet tube 82 at nozzle seat 42 increases to reduce the fluid pressure in fluid chamber 78 below the value of the fluid pressure in tank 10. As a result, fluid flow from tank 10 is communicated through orifice 80 into fluid chamber 78 and discharged from the upper end 42 of outlet tube 82 to increase the fluid pressure differential on opposite sides of piston 74 from the reduction of pressure from fluid chamber 78. Thus, piston 74 is urged upwardly along with operating rod 55 to assist the full opening of main valve member 46 with a minimum overpressure. A reduction of pressure occurs in outlet tube 82 since upper end 86 is positioned closely adjacent nozzle 42 and utilizes the pressure reduction at the nozzle upon unseating of main valve member 46. As main valve member 46 moves to its full open position, the fluid pressure at the upper end 86 of flow passage 84 approaches but does not reach atmospheric pressure thereby creating a relatively large potential fluid pressure differential across piston 74. As a result, the fluid pressure accumulation from the early "crack" position to a "full open position" is minimized to provide an effect not substantially different from a pilot operated main valve member. Upon a reduction of fluid pressure in tank 10 after full opening of main valve member 46, piston 74 dampens the return movement of main valve member 46 to seated closed position on nozzle ring.

The safety relief valve of this invention is particularly adapted for use with low fluid pressures. For example, the set or crack pressure may be at 1 psi. The pressure for the full lift or full open position at one hundred and twenty (120) percent would be 1.2 psi which would result in a pressure of 0.5 psi within piston chamber 78 thereby creating a fluid pressure differential of 0.7 psi across piston 74 to assist piston 74 and rod 55 in an upward movement with minimal frictional contact of lip 104 on piston 74 against the inner surface of cylindrical body 94. It is noted that a negative pressure results in the opening of vacuum valve 60 with concave valve member 64 sliding downwardly along rod 55 to permit fluid flow from atmosphere to the interior of tank 10.

While the present invention is adapted for use without a separate external pilot valve, it is to be understood that a separate pilot valve could be utilized, if desired, in combination with the present invention.

The term "mechanical force" or "mechanical load" as used herein is interpreted as a non-fluid pressure force or load applied against the main valve member to hold the main valve member in seated position on a valve seat. The mechanical force or load may be, for example, variable or constant, may be gravity applied from a weight, or may be applied by a mechanical spring.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. In a fluid pressure relief system for a pressure vessel having a valve seat member defining a vent adjacent the upper portion of said pressure vessel;
a main valve member seated on said valve seat member under a mechanical force of a predetermined amount and having an upstream side in continuous fluid communication with fluid pressure within the pressure vessel;
an operating member operably connected adjacent one end to said main valve member;
a fluid pressure responsive member operably connected to said operating member adjacent the other end thereof;
a fluid chamber adjacent one side of said fluid pressure responsive member with the other side of said fluid pressure responsive member in continuous fluid communication with the interior of said pressure vessel without any substantial flow restriction therebetween;
fluid conduit means defining a fluid passage between said fluid chamber and said main valve member, said fluid conduit means having an inlet in fluid communication with said fluid chamber and an outlet adjacent said main valve member on said upstream side thereof at said valve seat member to permit fluid flow from said fluid chamber upon opening of said main valve member whereby a fluid pressure differential is provided on opposite sides of said fluid pressure responsive means upon an increase in fluid pressure within said pressure vessel resulting from a flow of fluid from said outlet at said valve seat member; and
an orifice extending through said fluid pressure responsive member being of a predetermined size to provide a restricted fluid flow between said fluid chamber and the interior of said pressure vessel for fluid flow through said fluid conduit means upon opening of said main valve member thereby to control the sensitivity of the main valve member after opening.

2. In a fluid pressure relief system as set forth in claim 1 wherein said operating member comprises an operating rod and said fluid pressure responsive member comprises a piston secured to said operating rod for movement with said operating rod and said main valve member.

3. In a fluid pressure relief system as set forth in claim 1 wherein said fluid pressure responsive member comprises a piston mounted within a cylinder forming said fluid chamber adjacent one side of said piston.

4. In a fluid pressure relief system as set forth in claim 1 wherein a nozzle ring defines said valve seat member and has an upper valve seat thereon supporting said main valve member in sealing relation under said mechanical force of a predetermined amount.

5. In a fluid pressure relief system as set forth in claim 4 wherein said fluid conduit means has said outlet adjacent said nozzle ring and spaced slightly from said main valve member on said upstream side thereof in fluid communication with the interior of said pressure vessel.

6. In a fluid pressure relief system as set forth in claim 1 wherein a counterweight is positioned on said main valve member to hold said main valve member on said valve seat member under a mechanical force of a predetermined amount.

7. A fluid pressure relief system for a pressure vessel comprising:
a tubular housing projecting above said pressure vessel;
a nozzle mounted on an upper end portion of said housing and defining an upper valve seat forming a vent for an upper portion of the pressure vessel;
a main valve member seated on said valve seat under a mechanical force of a predetermined amount for holding said main valve member in closed position on said valve seat under normal operating fluid pressure within said pressure vessel;
an operating rod within said pressure vessel having an upper end secured to said main valve member;
a piston within said pressure vessel secured to said operating rod adjacent the lower end thereof;

a cylinder within said pressure vessel receiving said piston for reciprocable movement and defining a fluid chamber adjacent one side of said piston with the other side of said piston in continuous fluid communication with the interior of said pressure vessel without any substantial flow restriction therebetween; and fluid conduit means defining a fluid passage between said fluid chamber and said main valve member, said fluid conduit means having a lower inlet in fluid communication with said fluid chamber and an upper outlet adjacent said nozzle to permit the flow of fluid from said fluid chamber through said fluid conduit means upon opening of said main valve member thereby to provide a fluid pressure differential on opposed sides of said piston.

8. A fluid pressure relief system as set forth in claim 7 wherein an orifice of a predetermined size is provided in said piston to permit restricted fluid communication between said fluid chamber and the interior of said vessel.

9. A fluid pressure relief system as set forth in claim 7 wherein said outlet of said fluid conduit means is positioned a lateral distance from said nozzle less than around four (4) inches.

10. A fluid pressure relief system as set forth in claim 7 wherein a separate counterweight is positioned on said main valve member to hold said main valve member in closed position on said valve seat under a normal operating pressure within said pressure vessel.

11. In a fluid pressure relief system for a pressure vessel having a valve seat member defining a vent;

a main valve member seated on said valve seat member under a mechanical force of a predetermined amount and having an upstream side in continuous fluid communication with fluid pressure within the pressure vessel;

an operating member operably connected adjacent one end to said main valve member;

a fluid pressure responsive member operably connected to said operating member adjacent the other end thereof;

a fluid chamber adjacent one side of said fluid pressure responsive member with the other side of said fluid pressure responsive member in fluid communication with the interior of said pressure vessel; and fluid conduit means defining a fluid passage between said fluid chamber and said main valve member, said fluid conduit means having an inlet adjacent said fluid chamber and an outlet adjacent said main valve member on said upstream side thereof at said valve seat member to permit fluid flow from said fluid chamber upon opening of said main valve member whereby a fluid pressure differential is provided on opposite sides of said fluid pressure responsive means upon an increase in fluid pressure within said pressure vessel resulting from a flow of fluid from said outlet as said valve seat member;

said fluid pressure responsive member comprising a piston mounted within a cylinder forming said fluid chamber adjacent one said of said piston; said cylinder including a cylindrical body and an upper end over said cylindrical body; said piston, cylindrical body and upper end being formed of a similar plastic material to provide the same rate of thermal expansion, said cylindrical body and said upper end being unsecured to each other.

12. A fluid pressure relief system for a pressure vessel comprising:

a nozzle defining an upper valve seat forming a vent for the pressure vessel;

a main valve member seated on said valve seat under a mechanical force of a predetermined amount for holding said main valve member in closed position on said valve seat under normal operating fluid pressure within said pressure vessel;

an operating rod secured adjacent one end to said main valve member;

a piston secured to said operating rod adjacent the other end thereof;

a cylinder receiving said piston for reciprocable movement and defining a fluid chamber adjacent one side of said piston with the other side of said piston in fluid communication with the interior of said pressure vessel;

fluid conduit means defining a fluid passage between said fluid chamber and said main valve member, said fluid conduit means having an inlet adjacent said fluid chamber and an outlet adjacent said nozzle to permit the flow of fluid from said fluid chamber upon opening of said main valve member thereby to provide a fluid pressure differential on opposed sides of said piston; and a vacuum valve member mounted on said operating rod for relative sliding movement and spring urged into sealing relation with said main valve member, said main valve member having a central opening therethrough and said vacuum valve member closing said central opening under normal operating pressure within said pressure vessel, said vacuum valve member opening upon a predetermined negative pressure within said pressure vessel to permit fluid flow within said pressure vessel through said central opening of said main valve member.

13. A method of providing a fluid pressure relief system for a pressure vessel having a nozzle forming a vent and a main valve member seated on said nozzle; said method comprising the following steps:

providing a mechanical force of a predetermined amount against said main valve member to hold said main valve member in seated position against said nozzle under normal operating fluid pressures;

operably connecting a fluid pressure responsive member to said main valve member with one side of said fluid pressure responsive member in fluid communication with the interior of the pressure vessel;

providing a separate fluid chamber on an opposed side of said fluid pressure responsive member;

providing a fluid passage from said separate fluid chamber to an outlet closely adjacent said nozzle whereby upon unseating of said main valve member at a predetermined fluid pressure within said pressure vessel, fluid flows from said separate fluid chamber through said outlet to reduce the fluid pressure therein and thereby provides a fluid pressure differential acting against said fluid pressure responsive member to assist in opening of said main valve member;

providing a piston for said fluid pressure responsive member;

providing an operating rod secured at one end to said main valve member and secured at an opposite end to said piston thereby to effect simultaneous movement of said piston and main valve member; and mounting a vacuum valve on said operating rod for relative movement to an open position upon the reaching of a predetermined low pressure within said pressure vessel.

14. In a fluid pressure relief system for a pressure vessel having an upper valve seat member defining a vent adjacent the upper portion of said pressure vessel;

a main valve member seated on said valve seat member under a mechanical force of a predetermined amount and having an upstream side in continuous fluid communication with fluid pressure within the pressure vessel;

an operating member operably connected adjacent one end to said main valve member for movement of said main valve member in an upward direction for opening thereof;

a fluid pressure responsive member operably connected to said operating member adjacent the other end thereof;

a fluid chamber adjacent one side of said fluid pressure responsive member with the other side of said fluid pressure responsive member in continuous fluid communication with the interior of said pressure vessel;

fluid conduit means defining a fluid passage between said fluid chamber and said main valve member, said fluid conduit means having an inlet in fluid communication with said fluid chamber and an outlet adjacent said main valve member on said upstream side thereof at said valve seat member to permit fluid flow from said fluid chamber upon opening of said main valve member whereby a fluid pressure differential is provided on opposite sides of said fluid pressure responsive member upon an increase in fluid pressure within said pressure vessel resulting from a flow of fluid from said outlet at said valve seat member; and flow control means of a predetermined size between said fluid chamber and the interior of said pressure vessel in continuous fluid communication with the interior of said pressure vessel for controlling fluid flow through said fluid conduit means upon opening of said main valve member thereby to control the sensitivity of the main valve member after opening.

15. In a fluid pressure relief system as set forth in claim 14;

a nozzle forming said upper valve seat member; and a counterweight positioned on said main valve member to hold said main valve member in closed position on said nozzle under a normal operating pressure within said pressure vessel.

* * * * *